United States Patent [19]

Tokes et al.

[11] Patent Number: 4,925,422
[45] Date of Patent: May 15, 1990

[54] EXHAUST HEAD FOR COMPACT FLUORESCENT LAMPS

[75] Inventors: Jozsef Tokes; Laszlo Ugrosdy, both of Budapest, Hungary

[73] Assignee: Tungsram Reszvenytarsasag, Budapest, Hungary

[21] Appl. No.: 262,515

[22] Filed: Oct. 25, 1988

[30] Foreign Application Priority Data

Dec. 7, 1987 [HU] Hungary .............................. 5462/87

[51] Int. Cl.⁵ .......................................... H01J 9/395
[52] U.S. Cl. ........................................ 445/73; 141/66
[58] Field of Search ...................... 445/70, 73, 71, 43, 445/26, 9; 141/59, 63, 65, 66

[56] References Cited

U.S. PATENT DOCUMENTS

| | | | |
|---|---|---|---|
| 2,203,612 | 6/1940 | Cox | 141/59 |
| 2,284,036 | 5/1942 | Bol | 141/65 X |
| 2,417,361 | 3/1947 | Herzog | 141/66 X |
| 2,740,570 | 4/1956 | Breadner et al. | 141/65 |

FOREIGN PATENT DOCUMENTS 94532 4/1988 Japan ..................................... 445/26

Primary Examiner—Kenneth J. Ramsey
Attorney, Agent, or Firm—Michael N. Meller

[57] ABSTRACT

An exhaust head unit for compact fluorescent lamps comprises an exhaust head block, a double rubber seal arranged in the block and serving for the reception of exhaust tubes, a vacuum valve, a gas valve, and a diaphragm for regulating the gas flow, as well as a vacuum duct and a gas duct. The vacuum valve, the gas valve and the adjoining vacuum and gas ducts are all arranged within a single exhaust head block, the diaphragm of the gas flow simultaneously constituting the seat of the gas valve.

2 Claims, 1 Drawing Sheet

EXHAUST HEAD FOR COMPACT FLUORESCENT LAMPS

FIELD OF THE INVENTION

The invention concerns an exhaust head unit for compact fluorescent lamps comprising an exhaust head block, a double rubber seal arranged within the block and receiving the exhaust tube, a vacuum valve, a gas valve, a diaphragm for regulating the gas flow, a vacuum duct and a gas duct. By 'compact' is meant a tubular lamp bent into a compact shape, e.g., in the form of a U.

BACKGROUND OF THE INVENTION

In each case according to the structural configuration of the pumping heads conventionally used for exhausting compact fluorescent lamps, the pumping process is matched to the lamps having one exhaust tube or two exhaust tubes. (Exhaust tubes are also known as 'tubulation' but the former term is preferred herein.) In a known type of fluorescent lamp there is a single exhaust tube at one end of the light tube, while the current conductors (lead-in wires) and electrodes (cathodes) are built into both ends of the light tube. During the pumping process the light tube is exhausted via this single exhaust tube and filled with gas and mercury is dosed in. The pumping head used here is suitable for realizing a cyclical exhausting and flushing process, which means that in several alternating steps exhausting (or pumping; these terms being synonymous and used interchangeably herein) and flushing follow each other in a sequence of operating stages until the interior of the discharge vessel attains the desired gas purity.

Japanese Patent Specification No. 55-157918 describes, for example, a pump head construction which is suitable for the automatic realization of such a cyclical pumping process.

However, this process requires a significant expenditure of time and unnecessarily prolongs the duration of the operation of the pumping process (exhaustion and cathode activation); moreover, it cannot assure the required vacuum purity at the exhaust tube ends during cathode activation. From the nature of this method a further disadvantage follows, namely that the gases resulting from the cathode activation from the end without exhaust tube must be exhausted through the other end which does have an exhaust tube. The cathode at the end with the exhaust tube becomes thereby exposed to the dissociation gases, which not only make it difficult to activate the cathode but may also cause it to be poisoned.

According to another known solution the compact fluorescent lamp is equipped with two exhaust tubes with one respective tube at each end, whereby the two exhaust tubes in the suction head are alternatingly and simultaneously exhausted, as is the case in the solution with one exhaust tube. In comparison with the solution with a single exhaust tube, the solution with two exhaust tubes has the advantage that both cathodes have the same position relative to the gas flows. Apart from that, however, here also the cycle of exhausting and filling must be performed repeatedly, which is time-consuming. In the case of long and straight light sources a rapid pumping process is used which is based on continuous gas flushing. Through one exhaust tube at one end of the fluorescent lamp pure flushing gas is introduced into the discharge vessel of the lamp, while at the other end it is exhausted. This method, which is described in detail in Hungarian Patent Application No. 204/87, allows the duration of the operation of exhausting and cathode activation to be reduced to a minimum.

This exhausting process could also advantageously be used for compact fluorescent lamps. The currently existing pumps do not, however, afford this possibility because the two tightly adjacently arranged limbs of the discharge vessel of the compact fluorescent lamp, with the exhaust tubes at the ends of the limbs, fully exclude the possibility of connection to the pumps, as is conventional with straight fluorescent lamps.

SUMMARY OF THE INVENTION

The aim of this invention is to realize continuous pumping also for discharge vessels of compact fluorescent lamps and to develop a pumping head for the pump (exhaust) machine. In this way not only may a high pumping output be achieved but also a very high grade of gas purity may be assured, which represents a very significant quality parameter of lamps.

The essential characteristic of this invention consists in developing a pumping head unit which enables the discharge vessel of the fluorescent lamp to be pumped under constant flushing, the lamp being provided with tightly adjacently extending parallel limbs with exhaust tubes terminating at one end thereof.

The exhaust head unit according to the invention makes it possible to clamp the exhaust tubes in common, one of the exhaust tubes being connected to the vacuum system of the pump while the other exhaust tube is connected to the flushing or filling gas system, while at the same time also enabling the dosing of mercury into the discharge vessel and the filling of the latter with gas.

The present invention is based on the recognition that the structural elements for providing the functions of (vacuum) clamping the exhaust tubes, gas flushing, gas filling, exhausting and mercury dosing are all arranged together within one block in an extremely small volume whereby even for extremely small exhaust tube spacings (15-30 mm) the possibility exists of connecting the two adjacently extending exhaust tubes to the vacuum and gas systems separately from each other in a vacuum-tight manner while at the same time also solving the problem of gas filling and mercury dosing.

Accordingly, our invention concerns an exhaust head unit for compact fluorescent lamps, comprising an exhaust head block within which is arranged for the receipt of exhaust tubes a double rubber seal (vacuum clamp), a vacuum valve, a gas valve, a flow restrictor throat part for regulating the gas flow as well as a vacuum duct and a gas duct.

The essence of the exhaust head unit according to the invention is that the vacuum valve, the adjoining vacuum duct and gas duct, the seat of the gas valve which is simultaneously the throat for regulating the gas flow, are all arranged within a single exhaust head block.

BRIEF DESCRIPTION OF THE DRAWING

The invention is described in greater detail with reference to the accompanying diagrammatic drawing, which shows a cross section of the exhaust head unit with elements connected thereto.

DETAILED DESCRIPTION OF THE PREFERRED EMBODIMENT

Figure 1:
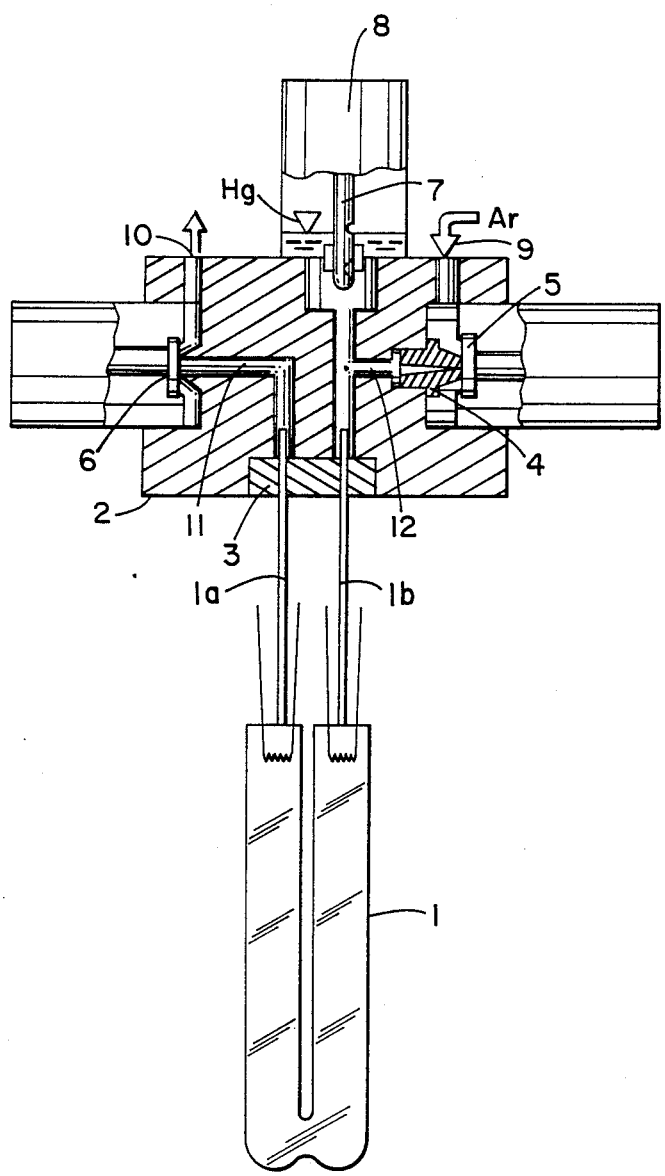

In a nest or seat formed in the lower end face of a pumping head block 2 there is a double rubber seal 3. An exhaust tube 1a on the exhaust side of a discharge vessel 1 vacuum-tightly connects the rubber seal 3 with a vacuum duct 11 while a gas-side exhaust tube 1b does the same with the rubber seal 3. The exhaust side of exhaust tube 1a is coupled via the vacuum duct 11 to the vacuum system of a pump. The vacuum duct 11 can be closed at its exhaust end by a vacuum valve 6 formed at one side of the pumping head block 2. When vacuum valve 6 is open, there is flow communication via a vacuum coupling 10 with the vacuum pump. The flushing or fill gas passes through a gas coupling 9 and the gas valve 5 to a diaphragm controlling the gas flow. The gas flows through the bore of the flow restrictor throat part 4 controlling the gas flow via a gas duct 12 and a gas-side exhaust tube 1b into the discharge vessel 1 when the gas valve is open. The bore of the throat 4 controlling the gas flow is so dimensioned that in the state of equilibrium the through-flowing gas stream sets the pressure of the fill gas in the discharge vessel 1 with the resistance of the exhaust tube 1a on the exhaust side. Analogously to the vacuum valve 6, the gas valve 5 is arranged at one of the sides of the pumping head block 2.

A device 8 for dosing mercury into the discharge vessel 1 permits mercury drops to fall by virtue of the movement of a dosing cock 7 into the vertical branch of the gas duct 12. From here the mercury is entrained in the gas stream through the gas-side exhaust tube 1b to arrive into the discharge vessel 1. The mercury-dosing device is formed in the upper surface of the pumping head block 2 opposite to the surface at which the double rubber seal 3 is disposed.

Accordingly, the invention concerns the exhausting of the discharged vessel of a low pressure gas discharge light source, i.e., a compact fluorescent lamp having two parallel limbs and including exhaust tubes and cathodes, for the decomposing of the cathode coating, for dosing in the discharge material and filling with gas, whereby the exhaust head suited for clamping the exhaust tubes is disposed within a pumping head block of a structural unit of the assembly, which block assures at least three different functions and which may be automatically activated, if desired.

The pumping head block according to the invention formed with coupling-free gas paths has an extremely small volume and is a very clean structural element suitable for realizing exhausting of the discharge vessel of compact fluorescent lamps under constant gas flushing. The introduction of the flushing gas via one of the exhaust tubes takes place in such a manner that during flushing, exhausting takes place via the other exhaust tube clamped into the pumping head block. The pumping block head connects one of the exhaust tubes to the communicating gas system while the other exhaust tube connects to the vacuum system and supplies the discharge vessel with filling gas and the discharge material additive. In this way, the solution is economic and a pure pumping process can be used in the course of production of compact fluorescent light sources. The development of the pumping head block with small dimensions and reduced material consumption makes it possible to form the pump proportionally with the mass of the discharge vessel.

We claim:

1. An exhaust head unit for coupling with first and second exhaust tubes which respectively communicate with first and second ends of a compact fluorescent lamp, comprising a unitary exhaust head block, a double rubber seal arranged in said block, said first and second exhaust tubes being received in said seal, a vacuum valve, a gas valve and a throat means for regulating the gas flow, as well as a vacuum duct and a gas duct, wherein said first exhaust tube communicates with said vacuum duct and said second exhaust tube communicates with said throat means via said gas duct, said flow out of said vacuum duct is controlled by said vacuum valve, and said constitutes the seat for said gas valve and wherein said vacuum valve, said gas valve, said vacuum duct, and said gas duct are all arranged within said exhaust head block, whereby through flushing of said lamp is possible when said first and second exhaust tubes are respectively coupled to only said exhaust head.

2. A pumping head unit according to claim 1, further comprising a mercury-dosing device arranged at a side of said pumping head block which is opposite to the side at which said second exhaust tube enters said block, said mercury-dosing device communicating with said first exhaust tube by way of said gas duct.

* * * * *